(12) United States Patent
Oh

(10) Patent No.: US 12,134,380 B2
(45) Date of Patent: Nov. 5, 2024

(54) APPARATUS AND METHOD FOR CONTROLLING DRIVING OF VEHICLE

(71) Applicants: Hyundai Motor Company, Seoul (KR); Kia Corporation, Seoul (KR)

(72) Inventor: Tae Dong Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 564 days.

(21) Appl. No.: 17/467,937

(22) Filed: Sep. 7, 2021

(65) Prior Publication Data

US 2022/0314979 A1 Oct. 6, 2022

(30) Foreign Application Priority Data

Apr. 1, 2021 (KR) ........................ 10-2021-0042623

(51) Int. Cl.
*B60W 30/095* (2012.01)
*B60W 30/09* (2012.01)
*B60W 30/12* (2020.01)

(52) U.S. Cl.
CPC ........ *B60W 30/0956* (2013.01); *B60W 30/09* (2013.01); *B60W 30/12* (2013.01); *B60W 2520/10* (2013.01); *B60W 2520/12* (2013.01); *B60W 2530/201* (2020.02)

(58) Field of Classification Search
CPC .. B60W 30/0956; B60W 30/09; B60W 30/12; B60W 2520/10; B60W 2520/12; B60W 2530/201; B60W 30/16; B60W 30/18145; B60W 2556/50; B60W 60/001; B60W 30/18; B60W 40/06; B60W 40/10
See application file for complete search history.

(56) References Cited

U.S. PATENT DOCUMENTS

| | | | | |
|---|---|---|---|---|
| 11,702,072 | B2 * | 7/2023 | El Haj Shhade | G08G 1/167 701/36 |
| 2018/0297590 | A1 * | 10/2018 | Kang | B60W 30/09 |
| 2020/0130696 | A1 * | 4/2020 | Xiao | B60W 30/0953 |
| 2020/0384993 | A1 * | 12/2020 | El Haj Shhade | B60W 30/12 |
| 2021/0042535 | A1 * | 2/2021 | Abbott | G06V 20/58 |
| 2021/0300351 | A1 * | 9/2021 | Kumano | B60W 30/18163 |
| 2021/0402992 | A1 * | 12/2021 | Morimoto | B60W 30/10 |
| 2022/0153260 | A1 * | 5/2022 | Hamada | G06V 20/588 |
| 2022/0153265 | A1 * | 5/2022 | Kim | B60W 60/001 |
| 2022/0171977 | A1 * | 6/2022 | Oh | B60W 50/029 |
| 2023/0303064 | A1 * | 9/2023 | George | B60T 8/17558 |
| 2023/0347884 | A1 * | 11/2023 | Kim | B60W 30/09 |
| 2023/0347888 | A1 * | 11/2023 | Ueno | B60W 50/0098 |

* cited by examiner

*Primary Examiner* — Peter D Nolan
*Assistant Examiner* — Anwar Mohamed
(74) *Attorney, Agent, or Firm* — SLATER MATSIL, LLP

(57) ABSTRACT

An embodiment method for controlling driving of a vehicle includes collecting driving environment information including drive lanes and positions of a host vehicle and an object on a periphery of the host vehicle, generating virtual integrated lines based on a lane link, a lane side or a control path included in the driving environment information, extracting a target candidate group by determining a position of the object based on the virtual integrated lines, selecting a control target based on position relations between the virtual integrated lines and contour points of the target candidate group, calculating a control point to be tracked, and controlling driving of the host vehicle based on the control point.

20 Claims, 25 Drawing Sheets

<USE OF LANE SIDE-BASED VIRTUAL LINES>

<USE OF LANE LINK-BASED VIRTUAL LINES>

<USE OF CONTROL PATH-BASED VIRTUAL LINES>

FIG. 21
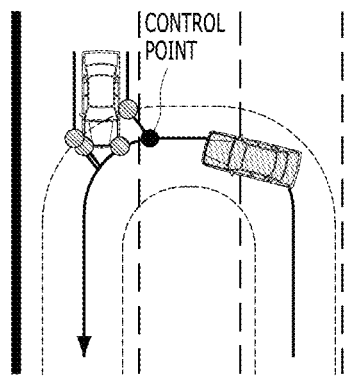
<CONTROL TARGET POINT AT U-TURN>
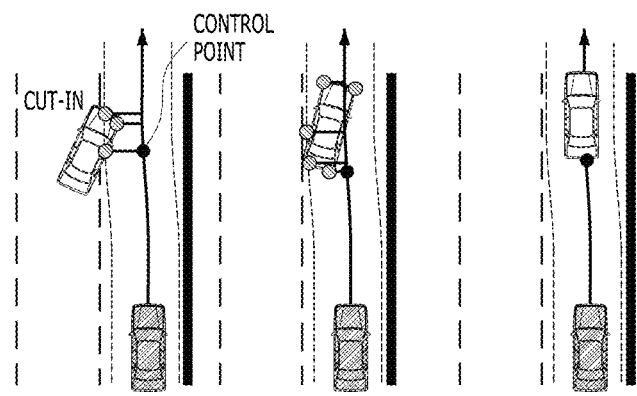
<CONTINUITY IN CONTROL POINTS IN CUT-IN SITUATION>

APPARATUS AND METHOD FOR CONTROLLING DRIVING OF VEHICLE

CROSS-REFERENCE TO RELATED APPLICATIONS

This application claims the benefit of Korean Patent Application No. 10-2021-0042623, filed on Apr. 1, 2021, which application is hereby incorporated herein by reference.

TECHNICAL FIELD

The present invention relates to an apparatus and method for controlling driving of a vehicle.

BACKGROUND

In general, an autonomous vehicle recognizes lines located at both sides of a lane, in which the vehicle is driving, and drives at the center between the two lines. In a conventional method for recognizing lanes and processing lane links for autonomous driving, a formalized lane which is continuous and has a constant width and a curvature within a limit range is assumed, and an in-path driving path and a deflection driving path are determined by setting a lane link at the dead center between the two lines at the sides of the lane.

However, because a real road includes unusual sections, such as a section in which lines of a lane are discontinuous, a section in which a lane width is not constant, a turning section, such as a U-turn, etc., the lanes of the real road may differ from the formalized lane in terms of a lane width or a curvature. Due to such differences, on a road in which a lane link is one-sided or which includes an unusual section, lines of a lane are erroneously detected or are not detected and thus it is difficult to set an accurate driving path.

SUMMARY

The present invention relates to an apparatus and method for controlling driving of a vehicle. Particular embodiments relate to an apparatus and method for controlling driving of a vehicle which may provide in-path and deflection driving methods when the vehicle drives on a road including an unusual section, such as a section in which lines of a lane are discontinuous, a section in which a lane width is not constant, a turning section, such as a U-turn, etc.

Accordingly, embodiments of the present invention provide an apparatus and method for controlling driving of a vehicle that can substantially obviate one or more problems due to limitations and disadvantages of the related art.

An embodiment of the present invention provides an apparatus and method for controlling driving of a vehicle which may calculate appropriate control points for in-path and deflection driving by appropriately employing information, such as lane sides, lane links, control paths, etc., depending on a driving environment, so as to accurately determine a driving path on various types of roads.

Another embodiment of the present invention provides an apparatus and method for controlling driving of a vehicle which may improve in-path and deflection driving performances when the vehicle drives on a road including an unusual section, such as a section in which lines of a lane are discontinuous, a section in which a lane width is not constant, a turning section, such as a U-turn, etc., so as to secure ride comfort.

Additional advantages, objects, and features of embodiments of the invention will be set forth in part in the description which follows and in part will become apparent to those having ordinary skill in the art upon examination of the following, or may be learned from practice of the invention. The objectives and other advantages of embodiments of the invention may be realized and attained by the structure particularly pointed out in the written description and claims hereof as well as the appended drawings.

To achieve these objects and other advantages and in accordance with the purpose of the invention, as embodied and broadly described herein, a method for controlling driving of a vehicle includes collecting driving environment information including drive lanes and positions of a host vehicle and at least one object on a periphery of the host vehicle, generating virtual integrated lines based on at least one information of a lane link, a lane side and a control path included in the driving environment information, extracting a target candidate group by determining a position of the at least one object based on the integrated lines, selecting a control target based on position relations between the integrated lines and contour points of the target candidate group, calculating a control point to be tracked so as to control driving of the host vehicle based on the control target, and controlling the driving of the host vehicle based on the control point.

In another embodiment of the present invention, an apparatus for controlling driving of a vehicle includes a first determiner configured to collect driving environment information including drive lanes and positions of a host vehicle and at least one object on a periphery of the host vehicle, a second determiner configured to generate virtual integrated lines based on at least one information of a lane link, a lane side and a control path included in the driving environment information, to extract a target candidate group by determining a position of the at least one object based on the integrated lines, and to select a control target based on position relations between the integrated lines and contour points of the target candidate group, and a driving controller configured to control driving of the host vehicle based on the control target.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of the invention. In the drawings:

FIGS. 21 and 22 are views illustrating a method for extracting control points of in-path and deflection vehicles.

DETAILED DESCRIPTION OF ILLUSTRATIVE EMBODIMENTS

Figure 1:
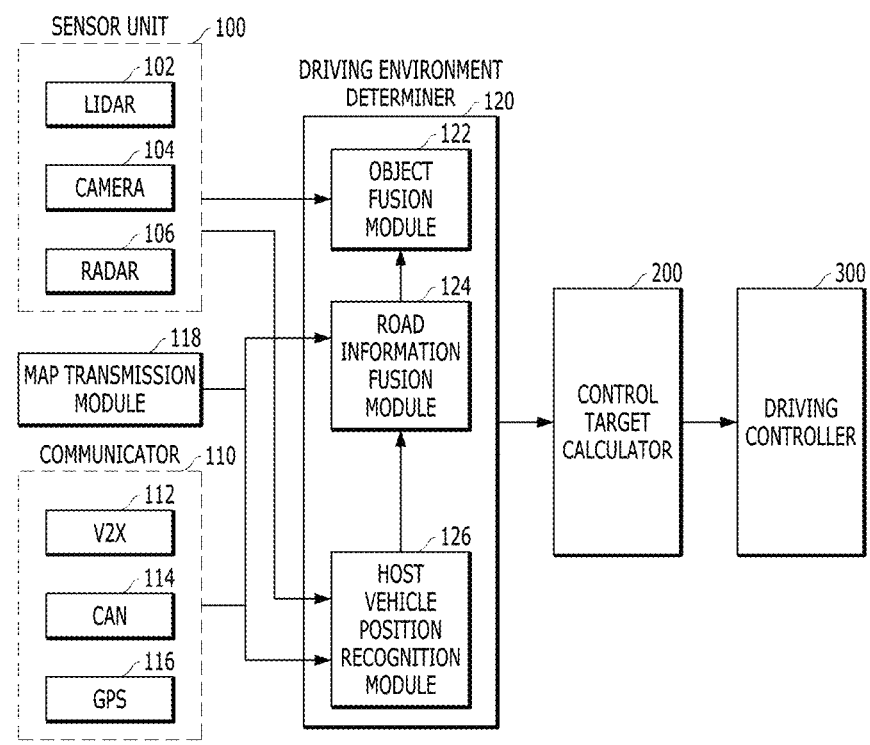
FIG. 1 is a schematic block diagram of an apparatus for controlling driving of a vehicle according to one embodiment of the present invention.

Reference will now be made in detail to preferred embodiments of the present invention, examples of which are illustrated in the accompanying drawings. However, the disclosure of the invention is not limited to the embodiments set forth herein and may be variously modified. In the drawings, in order to clearly describe embodiments of the present invention, descriptions of elements which are not related to the present invention are omitted, and the same or similar elements are denoted by the same reference numerals even when they are depicted in different drawings.

In the following description of the embodiments, it will be understood that, when a part "includes" an element, the part may further include other elements, and does not exclude the presence of such other elements, unless stated otherwise. Further, in the following description of the embodiments, parts denoted by the same reference numerals indicate the same elements.

In embodiments of the present invention, because the reason for deflection driving is that the surface of another vehicle comes close to a host vehicle lane, a deflection value of the host vehicle is determined based on a distance at which the other vehicle deviates from an adjacent lane, a lane width, a vehicle width, etc. Here, a virtual vehicle located in an opposite lane symmetrical to the other vehicle may be generated, and then central points of contour points of both vehicles are connected and used as control points, thereby being capable of effectively and intuitively generating a deflection path. Thereby, even though various vehicles are present complicatedly, the host vehicle may naturally and autonomously drive along the deflection path as if a human driver were actually driving the host vehicle, and thus, ride comfort and driving stability may be improved.

Hereinafter, an apparatus for controlling driving of a vehicle according to embodiments of the present invention will be described with reference to the accompanying drawings. First, main terms used in the description and the drawings of embodiments of the present invention will be defined below.

Host vehicle: one's own vehicle

Other vehicle: a vehicle other than the host vehicle

Peripheral vehicle: a vehicle detected by a sensor unit mounted in the host vehicle, other than the host vehicle Preceding vehicle: a peripheral vehicle driving just in front of the host vehicle Drive lane: a lane in which the host vehicle is currently driving Target lane: a lane to which the host vehicle desires to change Target lane vehicles: peripheral vehicles driving in the target lane FIG. 1 is a schematic block diagram of an apparatus for controlling driving of a vehicle according to one embodiment of the present invention.

Referring to FIG. 1, the apparatus according to one embodiment of the present invention includes a sensor unit 100, a communicator 110, a map transmission module 118, a driving environment determiner 120, a control target calculator 200 and a driving controller 300.

The sensor unit 100 may sense at least one peripheral vehicle located in front of, beside and/or behind a host vehicle, and may detect the position, speed and acceleration of each peripheral vehicle. The sensor unit 100 may include various sensors, such as a lidar 102, a camera 104, a radar 106, etc.

The lidar 102 may measure a distance between the host vehicle and the peripheral vehicle. The lidar 102 may measure the distance from the peripheral vehicle and the shape of the peripheral vehicle by calculating spatial position coordinates of a reflection point by radiating a laser pulse to the peripheral vehicle and measuring the arrival time of the laser pulse reflected by the peripheral vehicle.

The camera 104 may acquire an image on the periphery of the host vehicle through an image sensor. The camera 104 may include an image processor which performs processing of the acquired image, such as noise removal, image quality and saturation control, and file compression.

The radar 106 may measure the distance between the host vehicle and the peripheral vehicle. The radar 106 may measure the distance from the peripheral vehicle, the direction and height of the peripheral vehicle, etc. by radiating electromagnetic waves to the peripheral vehicle and receiving electromagnetic waves reflected by the peripheral vehicle.

The communicator no may receive information for sensing the positions of the host vehicle and other vehicles. The communicator no may include various apparatuses configured to receive information for sensing the position of the host vehicle, i.e., a vehicle to everything (V2X) apparatus 112, a controller area network (CAN) 114, a global positioning system (GPS) 116, etc.

The map transmission module 118 provides a precise map in which lanes are discriminable. The precise map may be stored in the form of a database (DB), may be automatically updated on a regular cycle using wireless communication or manually updated by a user, and may include information about merging sections of lanes (for example, including position information on the merging sections and legal speed limit position of the merging sections), road information depending on position, information about road branches, information about intersections, etc.

The driving environment determiner 120 may fuse object information about the host vehicle and the other vehicles on the precise map and then output the fused object information based on the information acquired by the sensor unit 100, the map transmission module 118 and the communicator no. The driving environment determiner 120 may include an object fusion module 122, a road information fusion module 124 and a host vehicle position recognition module 126.

The host vehicle position recognition module 126 outputs precise position information on the host vehicle. The host vehicle position recognition module 126 may compare the information sensed by the sensor unit 100, GPS information on the host vehicle collected by the communicator no, and precise map information provided by the map transmission module 118 with each other, and may thus output the position information and position recognition reliability information on the host vehicle together.

The road information fusion module 124 outputs the precise map on the periphery of the host vehicle. The road information fusion module 124 outputs precise map information on the periphery of the host vehicle based on the position recognition reliability information and the precise map information.

The object fusion module 122 outputs fused object information to the control target calculator 200. The object fusion module 122 fuses objects onto the precise map based on the information sensed by the sensor unit wo and the precise map information on the periphery of the host vehicle, and then outputs the fused object information.

The control target calculator 200 may receive information about the objects fused onto the precise map, derive virtual lines based on a lane link, a lane side and a control path depending on a current driving situation, calculate in-path/deflection object candidates according to the positions of peripheral objects, and select in-path/deflection targets.

The driving controller 300 may calculate an in-path/deflection target control point based on a control target calculated by the control target calculator 200, may determine the driving path of the host vehicle, and may thus control the driving state of the host vehicle. The control target calculator 200 and the driving controller 300 may have configurations shown in FIGS. 2 and 3.

Figure 2:
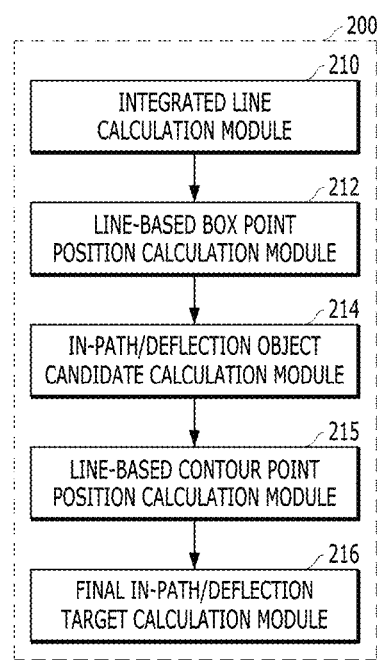
FIG. 2 is a schematic block diagram illustrating one example of the configuration of a control target calculator of FIG. 1.

FIG. 2 is a schematic block diagram illustrating one example of the configuration of the control target calculator 200 of FIG. 1.

The control target calculator 200 may derive the virtual lines based on the lane link, the lane side and the control path depending on the current driving situation based on the object-fused precise map output by the driving environment determiner 120, calculate the in-path/deflection object candidates according to the positions of other objects driving on the periphery of the host vehicle, and select final in-path/deflection targets, thereby being capable of calculating the control target.

Referring to FIG. 2, the control target calculator 200 may include an integrated line calculation module 210, a line-based box point position calculation module 212, an in-path/deflection object candidate calculation module 214, a line-based contour point position calculation module 215, and a final in-path/deflection target calculation module 216.

The integrated line calculation module 210 may derive lane link-based virtual lines, lane side-based virtual lines or control path-based virtual lines depending on the current driving situation. An input to the integrated line calculation module 210 may be fused information of position, speed and map information on vehicles adjacent to the host vehicle. The integrated line calculation module 210 may derive virtual lines referred to as "integrated lines" on the driving path of the host vehicle by selecting one from among the lane link, the lane side and the control path or combining at least two thereof.

The line-based box point position calculation module 212 may define objects on the periphery of the host vehicle as boxes having four vertexes, and may derive the positions of box points of the respective objects inside the integrated line. The positions of the box points of the respective objects may be set to the positions of the four vertexes of the boxes corresponding to the objects.

The in-path/deflection object candidate calculation module 214 may calculate in-path/deflection object candidates by determining how deep the objects are located inside the integrated line depending on the box point position information on the peripheral objects.

The line-based contour point position calculation module 215 may calculate how deep contour points of the in-path/deflection object candidates are located inside the integrated line.

The final in-path/deflection target calculation module 216 may select the final in-path/deflection targets based on the calculated positions of the contour points of the in-path/deflection object candidates.

Figure 3:
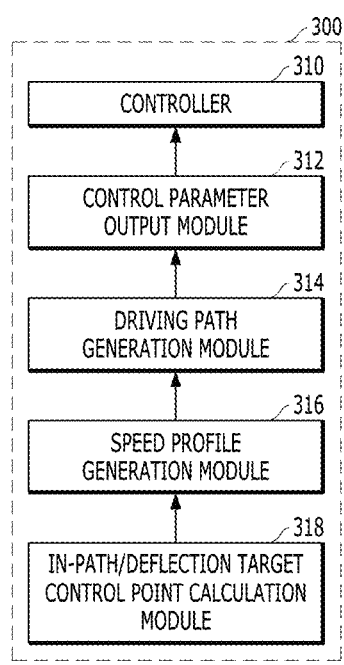
FIG. 3 is a schematic block diagram illustrating one example of the configuration of a driving controller of FIG. 1.

FIG. 3 is a schematic block diagram illustrating one example of the configuration of the driving controller 300 of FIG. 1. The driving controller 300 may control autonomous driving of the host vehicle based on the in-path/deflection targets determined by the control target calculator 200.

Referring to FIG. 3, the driving controller 300 may include an in-path/deflection target control point calculation module 318, a speed profile generation module 316, a driving path generation module 314, a control parameter output module 312, and a controller 310.

The in-path/deflection target control point calculation module 318 may calculate control points to be tracked on all types of roads including curved roads so as to control driving of the host vehicle when in-path/deflection vehicles are selected.

The speed profile generation module 316 may calculate a group of target speeds according to time which the host vehicle must track so as to track the control points input from the in-path/deflection target control point calculation module 318.

The driving path generation module 314 may calculate a host vehicle tracking control path so as to perform lateral control due to deflection or to maintain the path due to in-path.

The control parameter output module 312 outputs a control parameter to be transmitted as an actual controller input based on a driving path, i.e., the host vehicle tracking control path, output by the driving path generation module 314, and a speed profile. Then, the controller 310 may control autonomous driving of the vehicle according to the control parameter.

Figure 4:
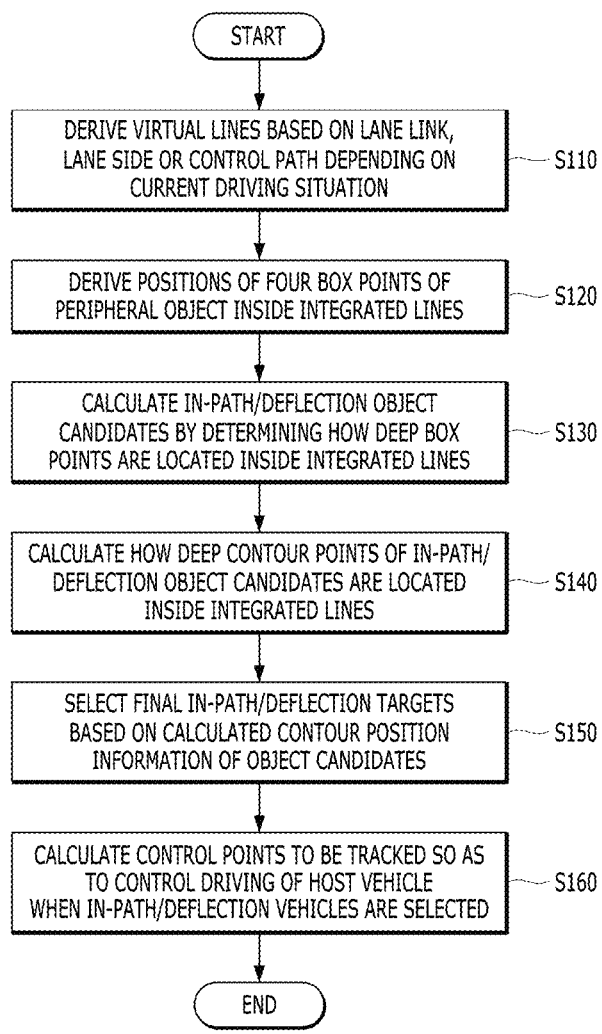
FIG. 4 is a flowchart representing control by the control target calculator according to one embodiment of the present invention.

FIG. 4 is a flowchart representing control by the control target calculator 200 according to one embodiment of the present invention.

The control target calculator 200 derives the virtual lines referred to as the integrated lines based on the lane link, the lane side or the control path depending on the current driving situation based on the object-fused precise map output by the driving environment determiner 120 (S110). Any one of the lane link, the lane side and the control path may be applied to the integrated lines, or at least two thereof may be combined so as to derive the integrated lines, depending on the driving situation.

Thereafter, the control target calculator 200 defines objects located on the periphery of the host vehicle as boxes, and derives the positions of box points of the respective objects inside the integrated line (S120). The positions of the box points of the respective objects may be set to the positions of the four vertexes of the boxes corresponding to the objects.

The control target calculator 200 calculates the in-path/deflection object candidates by determining how deep the box points of the peripheral objects are located inside the integrated line (S130), and calculates how deep the contour points of the in-path/deflection object candidates are located inside the integrated line (S140).

The control target calculator 200 may select the final in-path/deflection targets based on the contour positions of the in-path/deflection object candidates (S150).

When selection of the final in-path/deflection targets has been completed, the control target calculator 200 may calculate the control points to be tracked so as to control driving of the host vehicle, and provide the calculated control points to the driving controller 300 (S160).

Figure 5:
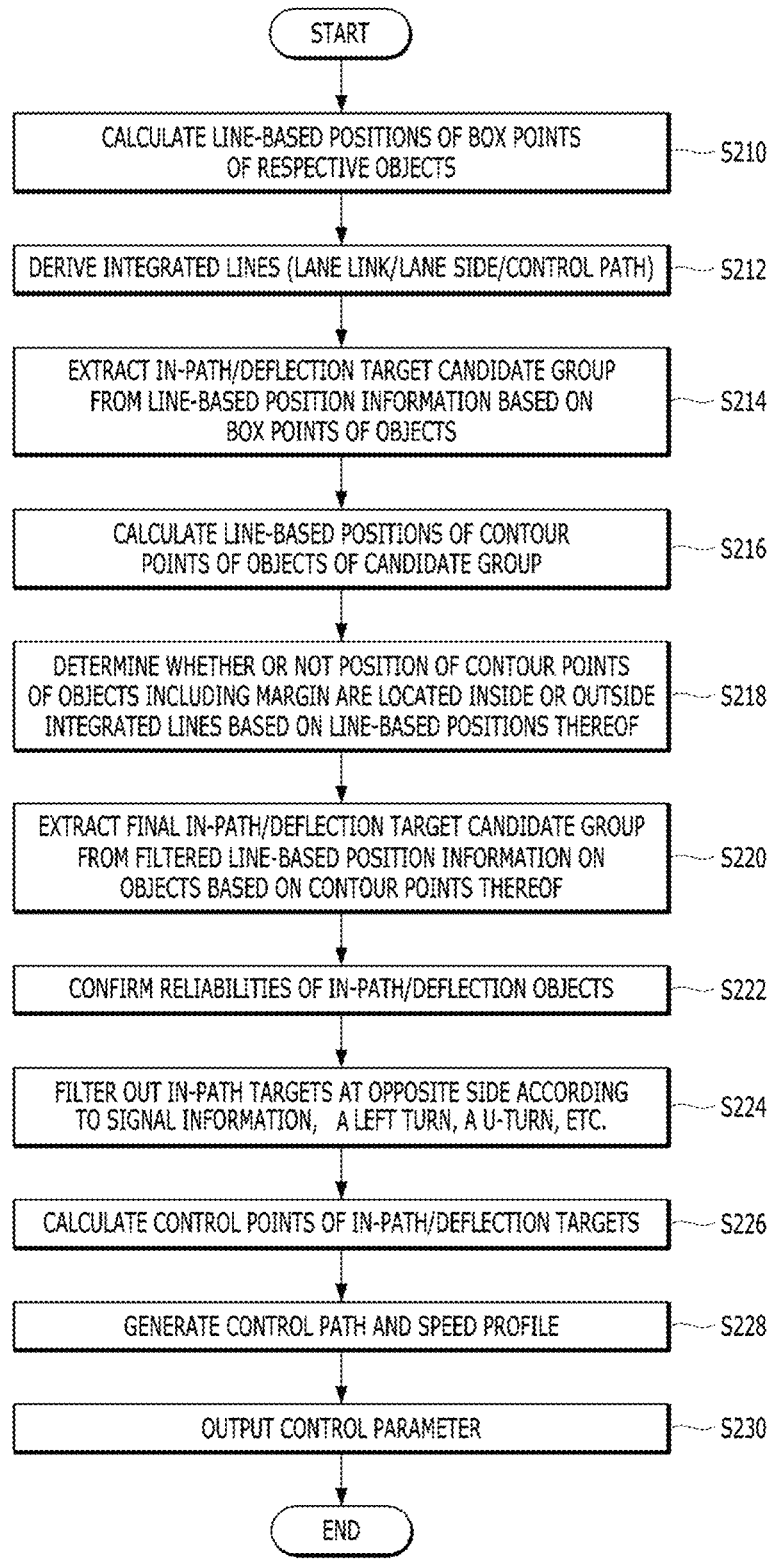
FIG. 5 is a flowchart representing a method for controlling driving of a vehicle according to one embodiment of the present invention.

FIG. 5 is a flowchart representing a method for controlling driving of a vehicle according to one embodiment of the present invention.

Line-based positions of box points of respective objects are calculated from fused information of positions, speeds and map information on vehicles on the periphery of the host vehicle (S210), and virtual lines referred to as integrated lines are generated based on at least one of a lane link, a lane side and a control path depending on the driving situation of the host vehicle (S212).

In-path/deflection target object candidates are calculated by determining how deep the objects are located inside the integrated line based on the positions of box points of the objects on the periphery of the host vehicle (S214). In order to minimize the amount of calculation of information on the peripheral objects recognized by sensors, objects on the periphery of a host vehicle lane may be picked out as candidates, and detailed information on the corresponding candidates may be calculated. When the objects are determined, final determination may be performed by a lidar having a relatively high lateral resolution, and sensor data having a higher lateral resolution may be substituted later.

Line-based positions of contour points of the objects picked out as the target object candidates are calculated (S216). Here, when the objects are detected by a combination of sensors having a low resolution (i.e., the radar and the camera) of the vehicle, there may be no contour points of the objects detected by the lidar and, in this case, the box points of the objects detected by the corresponding sensors may be substituted for the contour points. In case of the objects detected by the combinations of the sensors having a low resolution, a validity test of the corresponding objects may additionally be necessary.

Whether or not the calculated contour points of the objects are located inside or outside the integrated line based on the line-based positions thereof is determined (S218). Here, a margin may be added to the positions of the contour points based on the line-based positions thereof, and then whether or not the positions of the contour points, to which the margin is added, are located inside or outside the integrated line may be determined.

A final in-path/deflection target candidate group is extracted from filtered line-based position information on the objects based on the contour points thereof (S220), and reliability of the extracted in-path/deflection target candidate group are confirmed (S222).

In-path targets at the opposite side according to signal information at a left turn, a U-turn, etc. may be filtered out (S224). As such, unnecessary objects according to the signal information may be filtered out as needed, but it may be safer to determine whether or not the corresponding objects are targets in final determination by setting additional information. For example, filtering out of a vehicle which violates a traffic signal may be prevented.

Control points of in-path and deflection targets are calculated (S226). Calculation of control points of vehicles of interest may be very important in a curved road or in the case that only a part of a vehicle enters the host vehicle lane. For example, the control point of a bus, a part of which enters the host vehicle lane on a U-turn path, may vary depending on criterion.

A control path and a speed profile are generated based on the calculated control points (S228), and a control parameter is output (S230).

Hereinafter, a detail control method in each operation performed to execute the method according to one embodiment of the present invention will be described in more detail.

FIGS. 6 to 11 are views illustrating an integrated line determination method depending on a driving situation according to one embodiment of the present invention.

The control target calculator 200 may derive integrated lines by employing any one of a lane link, a lane side and a control path or combining at least two thereof.

In the center of a city, the cases in which a lane width is not actually constant are frequent even though it does not look different to human eyes. If a lane width at the position of a host vehicle is 3 m and the lane width at the position 50 m ahead is 3.3 m, a lane width difference may be not be recognized with human eyes.

Figure 6:
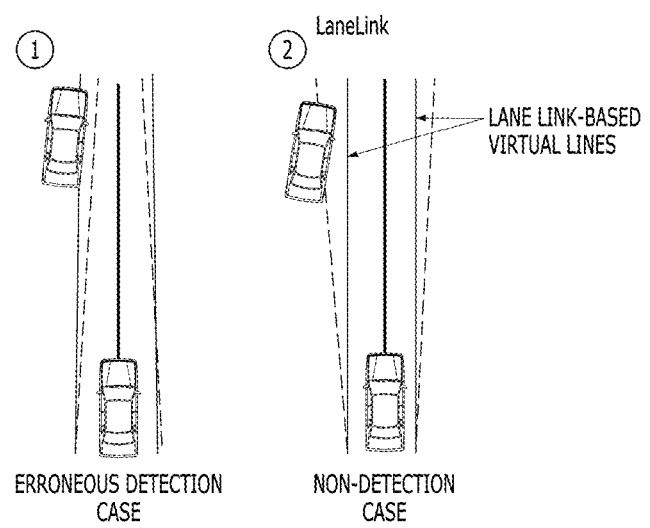
FIGS. 6, 7A, 7B, 8A, 8B, 9A, 9B, 10, and 11 are views illustrating a use lane determination method depending on a driving situation according to one embodiment of the present invention.

FIG. 6 is a view illustrating the case that an object is erroneously detected or the case that an object is not detected when virtual lines are set based on the lane link, ① illustrates the case that a lane width is decreased, and ② illustrates the case that a lane width is increased. A passenger may often recognize an object as an in-path target depending on whether or not the object actually violates a lane.

In the case of ①, the width of the actual lane ahead is decreased compared to the virtual lines set based on the lane link, but the decreased width of the actual lane is not reflected in the virtual lines. Therefore, even though a vehicle located in front of the left of the host vehicle does not enter the host vehicle lane, the host vehicle performs deceleration control, and thus the passenger may recognize erroneous detection.

In the case of ②, the width of the actual lane ahead is increased compared to the virtual lines set based on the lane link, but the increased width of the actual lane is not reflected in the virtual lines. Therefore, even though a vehicle located in front of the left of the host vehicle enters the host vehicle lane, the host vehicle does not perform deceleration control, and thus the passenger may recognize non-detection. Therefore, when the lane width is greater than a margin which it is safe for vehicles to pass, in-path targets are determined based on the lane side.

Considering these particulars, in embodiments of the present invention, the integrated lines are derived based on the lane link on a road in which a lane width is almost constant, such as an expressway, and the integrated lines are derived based on the lane side in a road section in which a lane width varies, such as a tollgate. In addition, the integrated lines are derived based on a point-level path in an unusual section, such as a lane change section.

Further, in embodiments of the present invention, the integrated lines are derived based on the lane side on a road in which a lane width is extremely changed, such as a city road, and the integrated lines are derived based on the lane link on a pocket lane or a road in which a lane width is excessively large. In addition, the integrated lines are derived based on the point-level path in an unusual section, such as a lane change section.

Figure 7A:
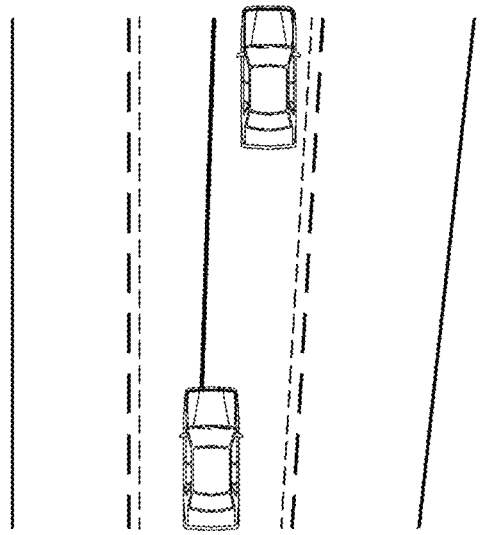
Figure 7B:
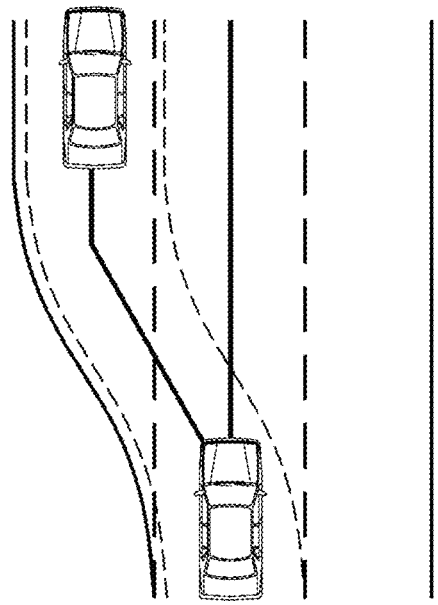

Referring to FIGS. 7A and 7B, because it is determined whether or not a peripheral vehicle violates a host vehicle lane by regarding an actual lane as ground truth in a general city driving situation, it may be determined whether or not the peripheral vehicle is an in-path object based on the lane side so as to increase accuracy in determination, as shown in FIG. 7A. However, when the shape of the lane side is not constant, such as a pocket lane, as shown in FIG. 7B, determination using virtual lines having a constant distance therebetween based on the central line of the lane other than determination based on the lane side may be easier. Therefore, in the pocket road, as shown in FIG. 7B, integrated lines may be derived based on the lane link.

FIGS. 8A and 8B and FIGS. 9A and 9B exemplarily illustrate the cases that integrated lines are derived based on a control path. In situations, such as the inside of an intersection, a left or right turn section, a P-turn section, a U-turn section, or a wide lane in a bus stop section, actual lanes may not exist, or vehicles may drive while violating actual lanes even though the actual lane exists. In this case, if a control path allowing a host vehicle to perform tracking control was calculated in the previous frame, in-path and deflection determination may be performed within a designated distance from the corresponding control path to the left or the right, which the host vehicle may pass.

Figure 8A:
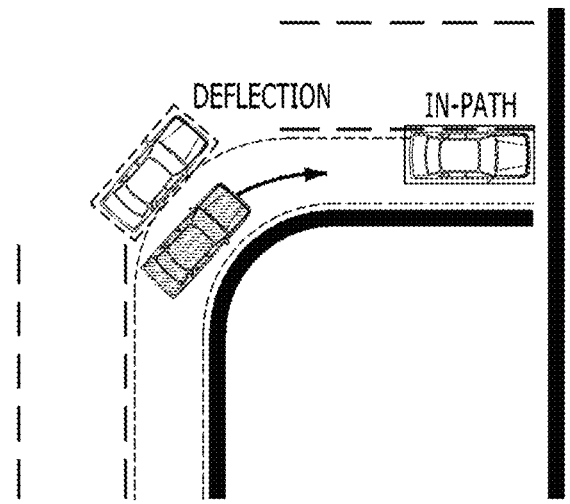
Figure 8B:
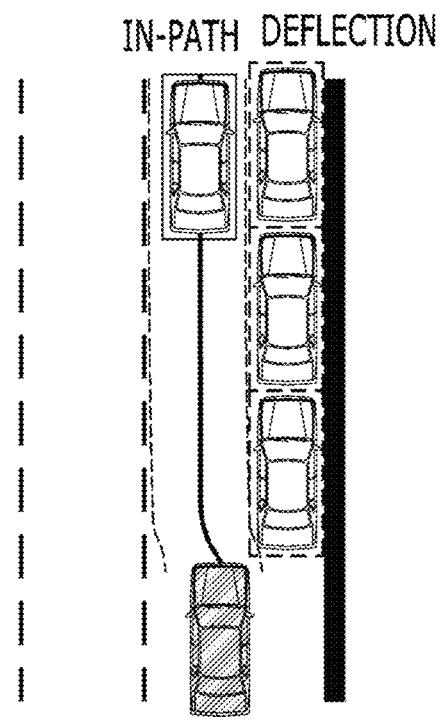

FIG. 8A illustrates an example in which a host vehicle recognizes an in-path object and a deflection object when the host vehicle turns right for a P-turn or the like, and FIG. 8B illustrates an example in which a host vehicle recognizes an in-path object and a deflection object in a wide lane in a bus stop section. In the right turn section shown in FIG. 8A, in addition to an in-path vehicle in front of the host vehicle, an object in a left lane violates the host vehicle lane, but the object in the left lane may be determined as a deflection object other than an in-path object based on the control path of the host vehicle. In the wide lane, such as a bus stop section, shown in FIG. 8B, all vehicles in front of the host vehicle are within the host vehicle lane, but may be determined as in-path objects and deflection objects based on the control path along which the host vehicle desires to drive.

Figure 9A:
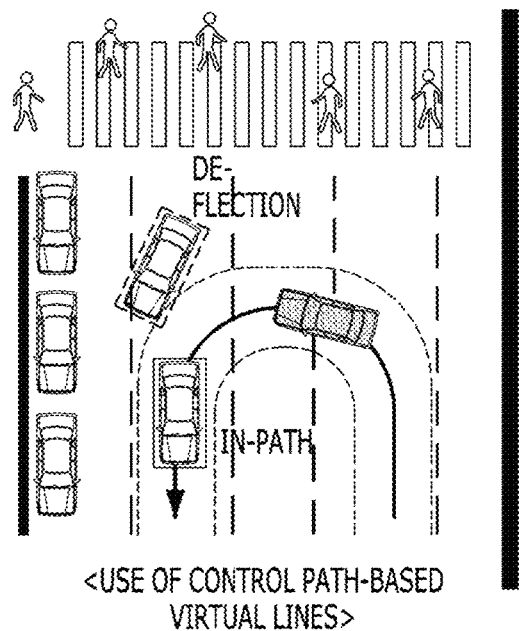
Figure 9B:
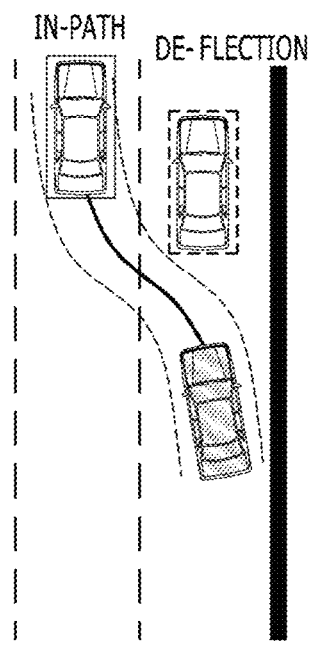

FIG. 9A illustrates an example in which a host vehicle recognizes an in-path object and a deflection object in a U-turn section, and FIG. 9B illustrates an example in which a host vehicle recognizes an in-path object and a deflection object when the host vehicle changes lanes. In the U-turn section shown in FIG. 9A, the host vehicle must turn in a direction different from the direction of lanes, and thus a vehicle located on the control path may be determined as an in-path object and a vehicle located at the side of the control path may be determined as a deflection object. In FIG. 9B, because the host vehicle is changing lanes, an in-path object and a deflection object may be determined based on the control path along which the host vehicle desires to drive.

When the integrated lines derived based on the control path, the control path is generated in the final stage, and thus, control path information in the previous frame is used. Therefore, in a stage in which a driving strategy is not fixed (i.e., a stage in which it is determined whether or not lane change is performed), lane side-based or lane link-based determination may be performed, or determination in a corresponding frame may be held off and determination based on the control path in the previous frame may be finally performed in the next frame. Here, a delay of one frame may occur, but such a delay is ignorable considering that determination as to inaccuracy in sensor recognition is generally held off for three frames. In a situation in which the control path is continuously changed (path correction during lane changes, or the like), the integrated lines in a section in consideration of a direction and range of changing the control path must be generated, and thus, it is necessary to predict the estimated position of the control path according to time.

Figure 10:
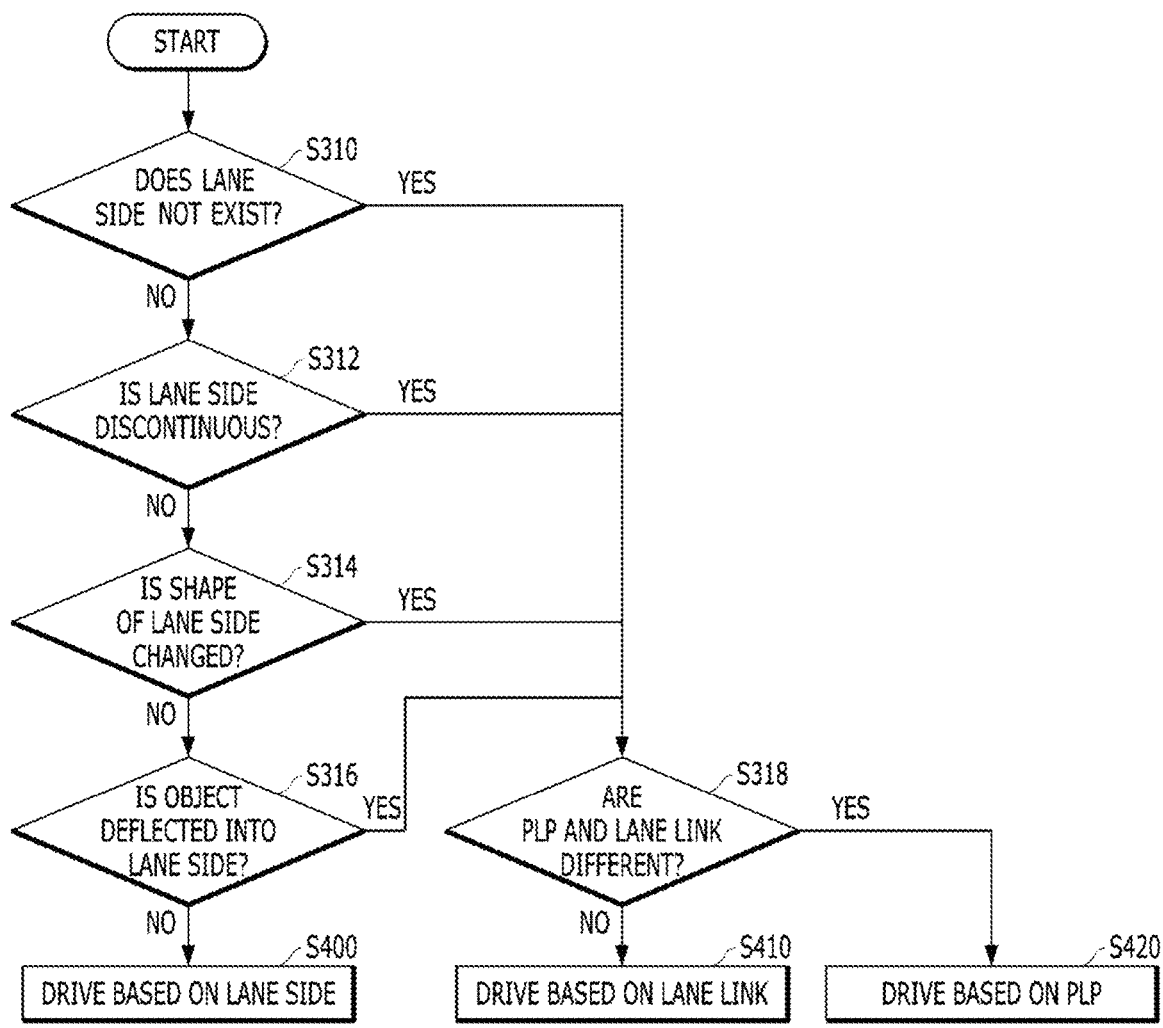

FIG. 10 is a flowchart representing a method for determining a lane used to derive integrated lines depending on a driving situation.

First, it is determined whether or not a lane side does not exist (S310), and it is determined whether or not a point-level path (PLP) and a lane link are different upon determining that the lane side does not exist (S318). Lane link-based driving is performed when the point-level path and the lane link coincide with each other (S410), and point-level path-based driving is performed when the point-level path and the lane link are different (S420).

When the lane side exists (NO at S310), it is determined whether or not the lane side is discontinuous (S312). Upon determining that the lane side is discontinuous, it is determined whether or not the point-level path and the lane link are different (S318). Lane link-based driving is performed when the point-level path and the lane link coincide with each other (S410), and point-level path-based driving is performed when the point-level path and the lane link are different (S420).

Upon determining that the lane side is continuous (NO at S312), it is determined whether or not the shape of the lane side is changed (S314). Upon determining that the shape of the lane side is changed, it is determined whether or not the point-level path and the lane link are different (S318). Lane link-based driving is performed when the point-level path and the lane link coincide with each other (S410), and point-level path-based driving is performed when the point-level path and the lane link are different (S420).

Upon determining that the shape of the lane side is fixed (NO at S314), it is determined whether or not there is an object, causing a host vehicle to drive in a deflection state, in the lane side (S316). Upon determining that there is an object, causing the host vehicle to drive in the deflection state, in the lane side, it is determined whether or not the point-level path and the lane link are different (S318). Lane link-based driving is performed when the point-level path and the lane link coincide with each other (S410), and point-level path-based driving is performed when the point-level path and the lane link are different (S420).

Upon determining that there is no object, causing the host vehicle to drive in the deflection state, in the lane side (NO at S316), lane side-based driving is performed (S400).

Figure 11:
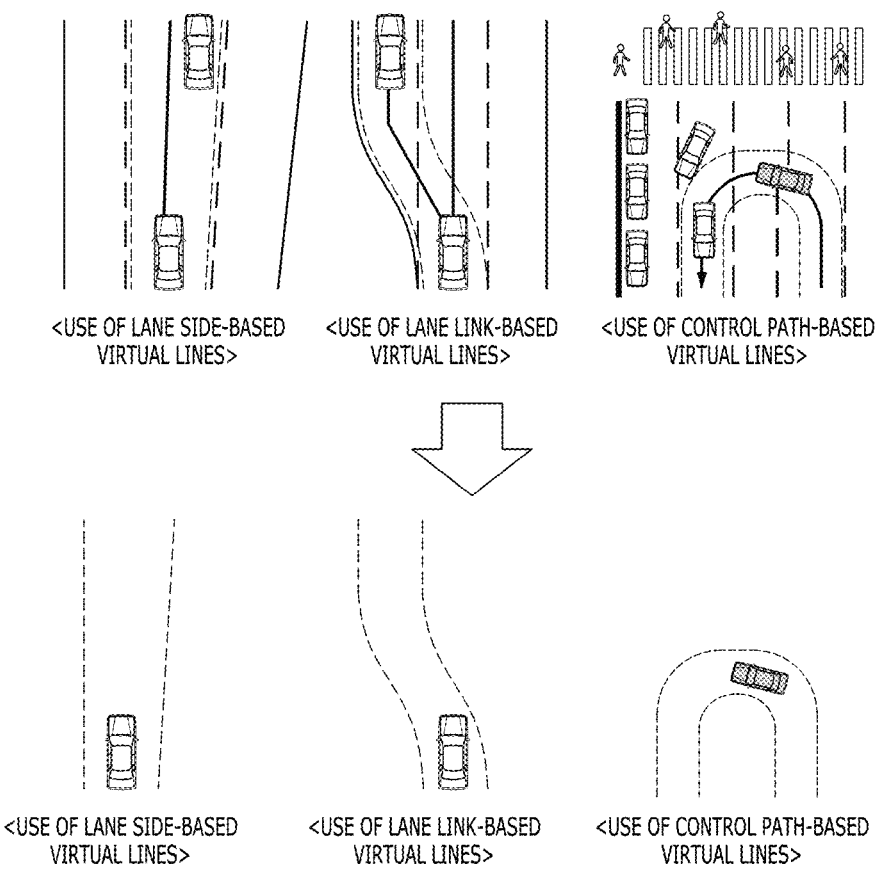

FIG. 11 is a view exemplarily illustrating integrated lines derived depending on a driving situation.

Referring to FIG. 11, when the shape of a lane side is fixed and there is no object, causing a host vehicle to drive in the deflection state, in the lane side, i.e., when the host vehicle drives on a road in which a lane width is constant, integrated lines may be derived based on the lane side.

When a point-level path and a lane link coincide with each other, for example, when the host vehicle changes lanes, integrated lines may be derived based on the lane link.

When the point-level path and the lane link are different, for example, when the host vehicle is making a U-turn, integrated lines may be derived based on the point-level path.

As such, lines based on a precise map may be prioritized, and lines based on a control path may be subordinately considered, as lines used to generate integrated lines for in-path and deflection determination. Because the control path is not ground truth and may thus have errors, it may be desirable that actual lanes are prioritized. When precise map-based lanes are used, the integrated lines may be derived based on a lane side or a lane link. Because the lane link-based integrated lines may be different from an actual lane which is visible to the naked eye, the highest priority may be given to the lane side-based integrated lines, and then the lane link-based integrated lines and the control path-based integrated lines may be prioritized in order. When the precise map is not constructed or the precise map is not followed due to road work or an accident, determination may be performed based on the lanes acquired by a camera. Automated determination of integrated lines may be exemplarily performed through the method shown in FIG. 10, but various changes to the method are possible depending on a road situation, a driving situation or a driving environment.

Figure 12:
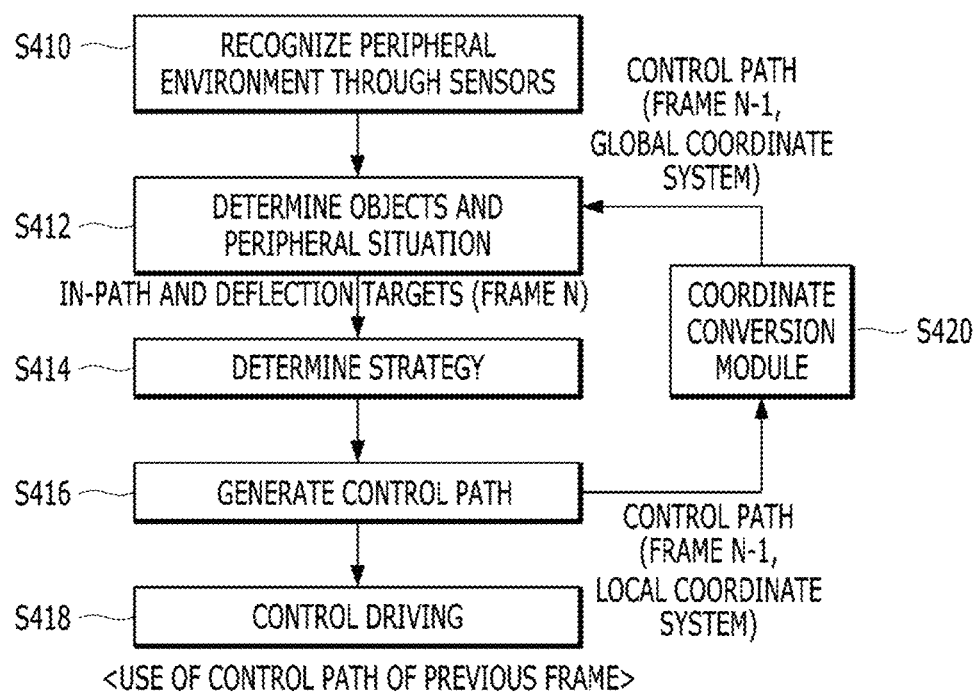
FIGS. 12 and 13 are views illustrating a method for generating integrated lines based on a control path.
Figure 13:
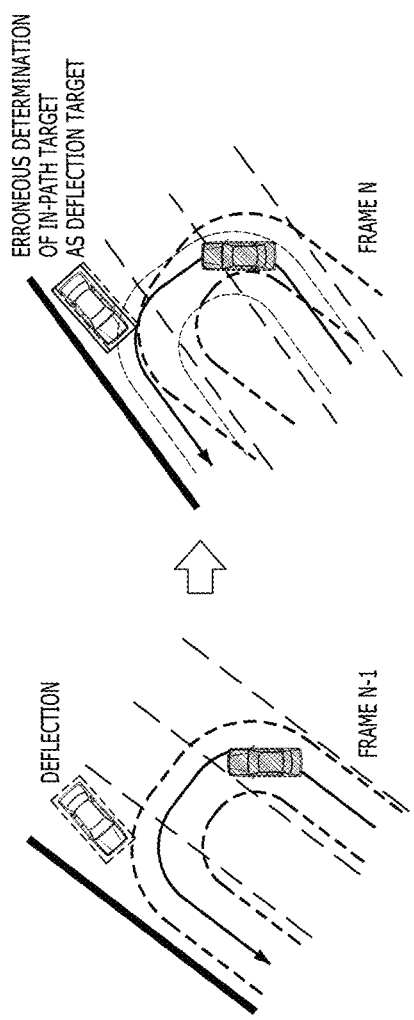

FIGS. 12 and 13 are views illustrating a method for generating integrated lines based on a control path.

Because the control path is determined in the final stage of the previous frame, it is necessary to determine the control path after a driving strategy is observed at a point in time when determination as to use lanes is performed.

Therefore, after a peripheral environment is recognized by the sensors (S410), objects and a peripheral situation are determined (S412). Here, in-path and deflection targets in the current frame (frame N) may be determined using information in the previous frame (frame N−1). Because sensor information is input in the form of relative distances and the precise map has an absolute coordinate system (the world geodetic system 1984 (WGS84), the universal transverse Mercator (UTM) coordinate system or the like), the integrated lines fixed on the precise map must be moved depending on heading of a host vehicle and a change in the position thereof. When the integrated lines are not corrected depending on a change in the position of the host vehicle, heading of the host vehicle and the change in position thereof are not reflected for one frame, and thus error of several tens of cm may occur and thereby cause erroneous determination and non-determination during in-path and deflection determination requiring resolution of cm. As shown in FIG. 13, when the control path in the previous frame (frame N−1) is not corrected in the current frame (frame N) so as to conform to a current change in the position of the host vehicle, an error may occur. Therefore, the control path in the previous frame (frame N−1) may be stored in a global coordinate system on the map, and the control path stored in the global coordinate system may be read and used in the next frame (S420). The relative positions of the integrated lines may be normally corrected through coordinate system reconversion in a turning situation, such as a U-turn, a P-turn or a lane change.

After in-path and deflection targets are determined in the current frame (frame N), a driving strategy is determined (S414), and a control path is generated (S416).

Thereafter, driving of the host vehicle is controlled based on the generated control path (S418).

As described above, the integrated lines for in-path and deflection determination are generated, and in-path/deflection object candidates are calculated by determining how deep objects located on the periphery of a host vehicle are located inside the integrated lines depending on the positions of the box points of the objects.

Figure 14:
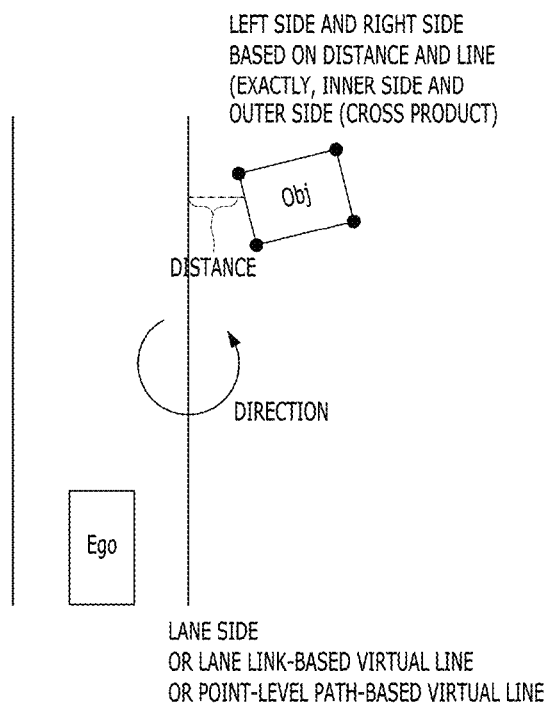
FIGS. 14, 15A, and 15B are views illustrating a method for extracting in-path/deflection target object candidates according to one embodiment of the present invention.

FIGS. 14 and 15 are views illustrating a method for extracting in-path/deflection target object candidates according to one embodiment of the present invention.

Referring to FIG. 14, when integrated lines are determined, distances and directions from four box points of all objects to different lines of the lane depending on the point source of the integrated lines, i.e., a lane side, a lane link or a control path, are determined. When the distances and the directions are determined, the distances and the directions may be determined by values and signs of the cross products of the straight line in the direction of the host vehicle lane and the perpendicular lines of the box points.

Figure 15A:
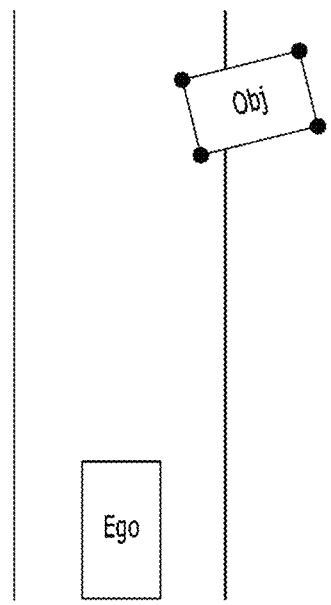
Figure 15B:
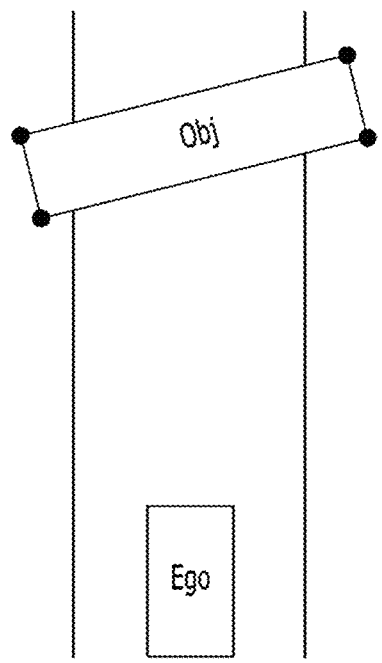

Referring to FIGS. 15A and 15B, it may be determined whether or not each object Obj is an in-path target candidate from geometric information between four box points of the corresponding object Obj and the lane. For example, when at least one of the box points of an object Obj are located inside a line or the integrated line, as shown in FIG. 15A, it may be determined that the object Obj belongs to an in-path target candidate group. Further, when at least one of the box points of an object Obj is located outside a left line or the left integrated line and at least one other of the box points of the object Obj is located outside a right line or the right integrated lines, it may be determined that the object Obj belongs to the in-path target candidate group.

As described above, when the target candidate group is extracted, the line-based positions of the contour points of objects determined as the target object candidate group are calculated.

Figure 16:
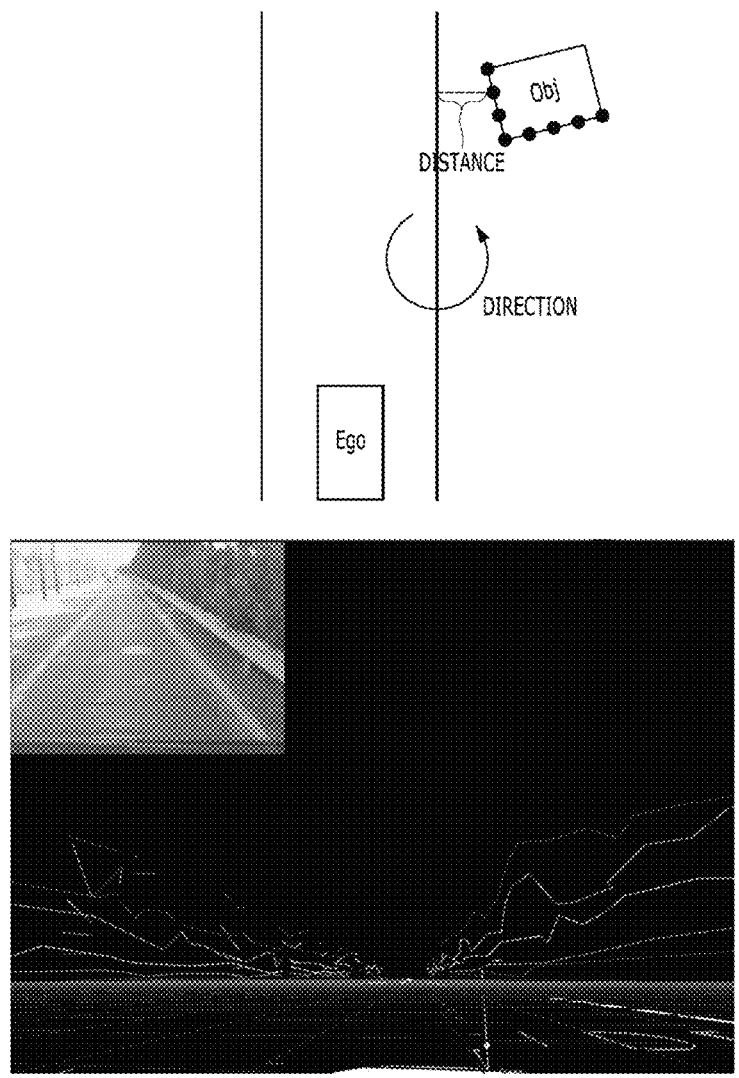
FIGS. 16 and 17 are views illustrating a method for calculating line-based positions of contour points of objects determined as belonging to a target object candidate group.
Figure 17:
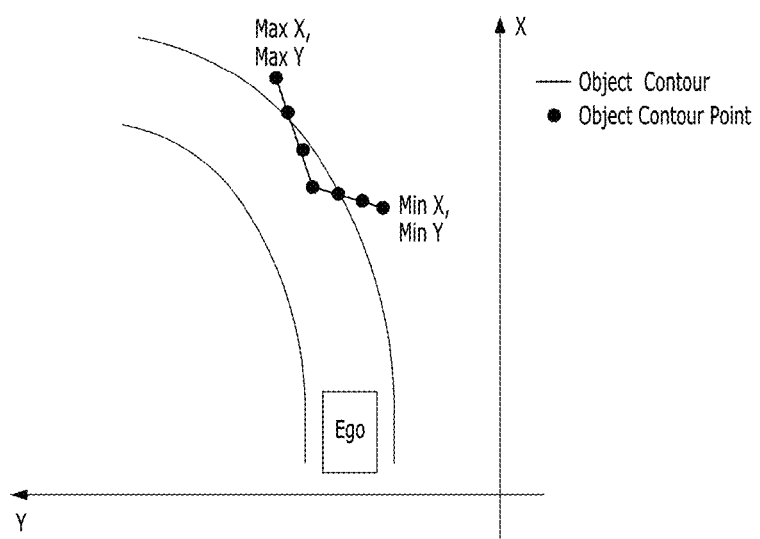

FIGS. 16 and 17 are views illustrating a method for calculating line-based positions of contour points of objects determined as a target object candidate group. In order to calculate the positions of the objects, the altitude values of lidar contour points acquired using a 3D lidar sensor may be used.

When the 3D lidar sensor is used, under-drivable and over-drivable objects, such as trees, traffic signs, etc., may be determined, and thus, an erroneous warning of in-path/deflection target objects may be effectively reduced. For example, because the host vehicle may pass under a tree over the height of vehicles, the tree includes contour points having heights equal to or higher than the height of the host vehicle, and may be classified into the under-drivable object. Because the host vehicle may pass over a speed bump on the ground, the speed bump includes contour points having heights equal to or lower than a height over which the host vehicle may pass, and may be classified into the over-drivable object.

Referring to FIG. 16, an effective object may be determined by executing operation of altitude values of the contour points of the object measurement lidar, an altitude value on the precise map, and the current tilt angle of the host vehicle. Therefore, erroneous determination of objects due to ground data on an inclined plane may be prevented. Here, both the trend of a change in the altitude of the path on the precise map and the range of measurement of the lidar sensor due to changes in the pitch and roll of the host vehicle must be considered together.

In case of a one-layer sensor object, such as a radar or a camera, the effective altitude value of an effective object is collectively applied to the four vertexes of the boxes of the object, and thus, the object is compatible with a logic in which altitude values are considered.

When coordinates of a point having the maximum X value of actual points of an object provided by a lidar module, coordinates of a point having the maximum Y value of the actual points, coordinates of a point having the minimum X value of the actual points, and coordinates of a point having the minimum Y value of the actual points are used, accurate determination may be performed in most cases using only the four points while using the actual points of the objects. Because most dynamic objects have a rectangular box shape, a corresponding object may be comparatively accurately determined using the maximum and minimum X coordinates and the maximum and minimum Y coordinates provided by the lidar module.

However, an object may be erroneously determined when only the maximum and minimum X coordinates and the maximum and minimum Y coordinates are used, as shown in FIG. 17, and thus, in order to improve accuracy in determination, calculation may be performed using contour points.

Figure 18:
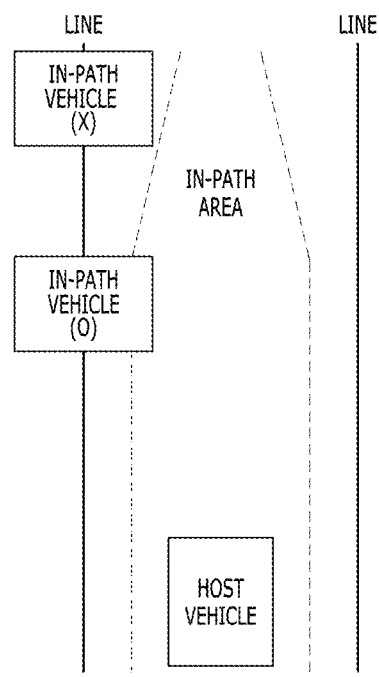
FIGS. 18, 19A, 19B, 19C, and 20 are views illustrating a method for determining a target object using contour points.
Figure 19A:
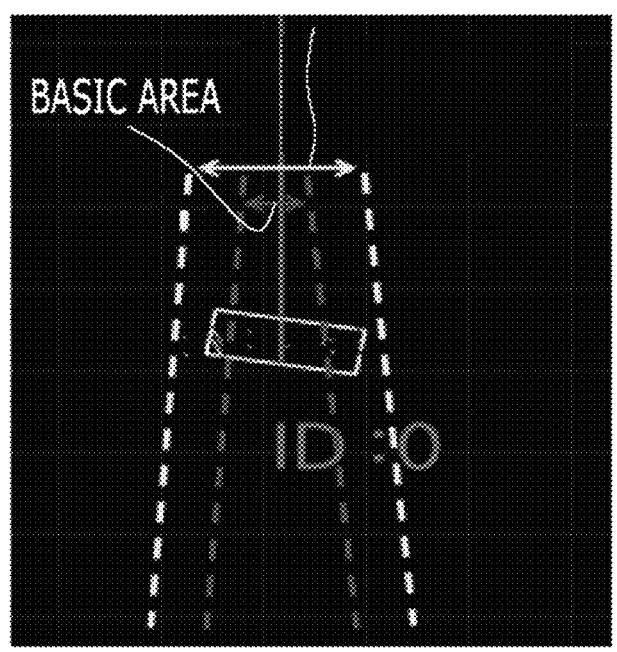
Figure 19B:
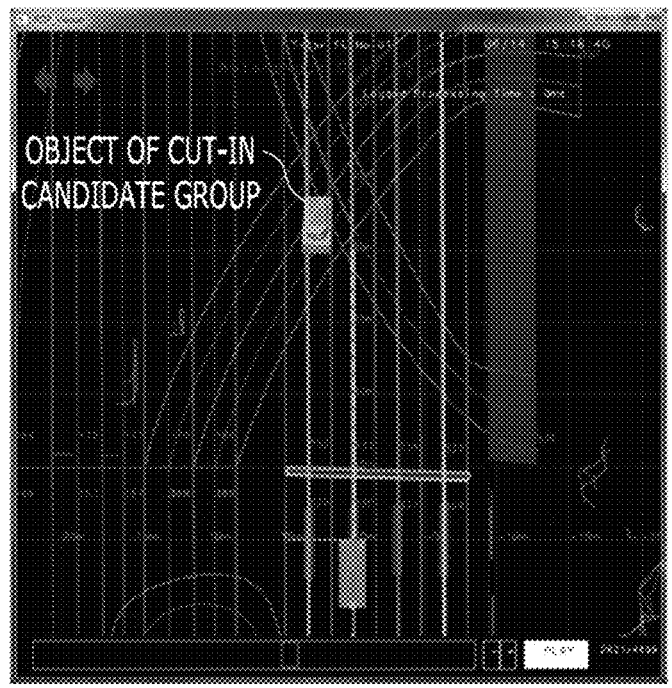
Figure 19C:
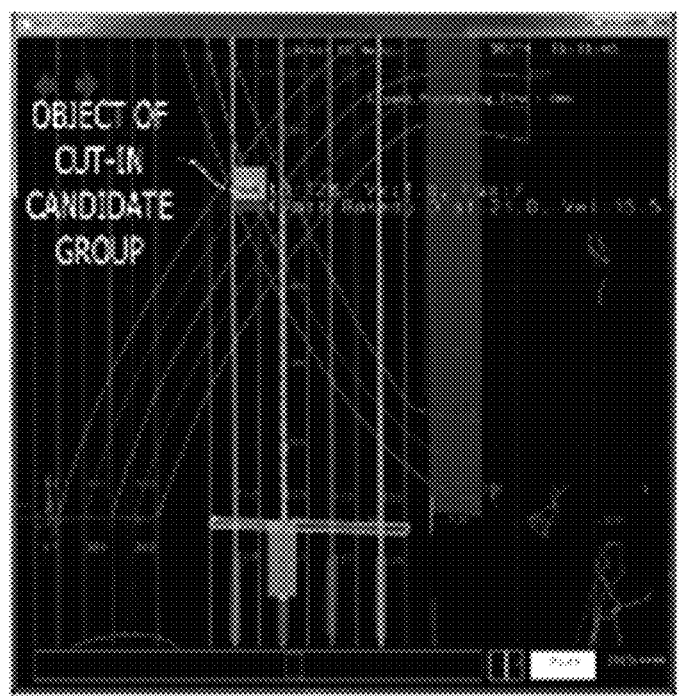
Figure 20:
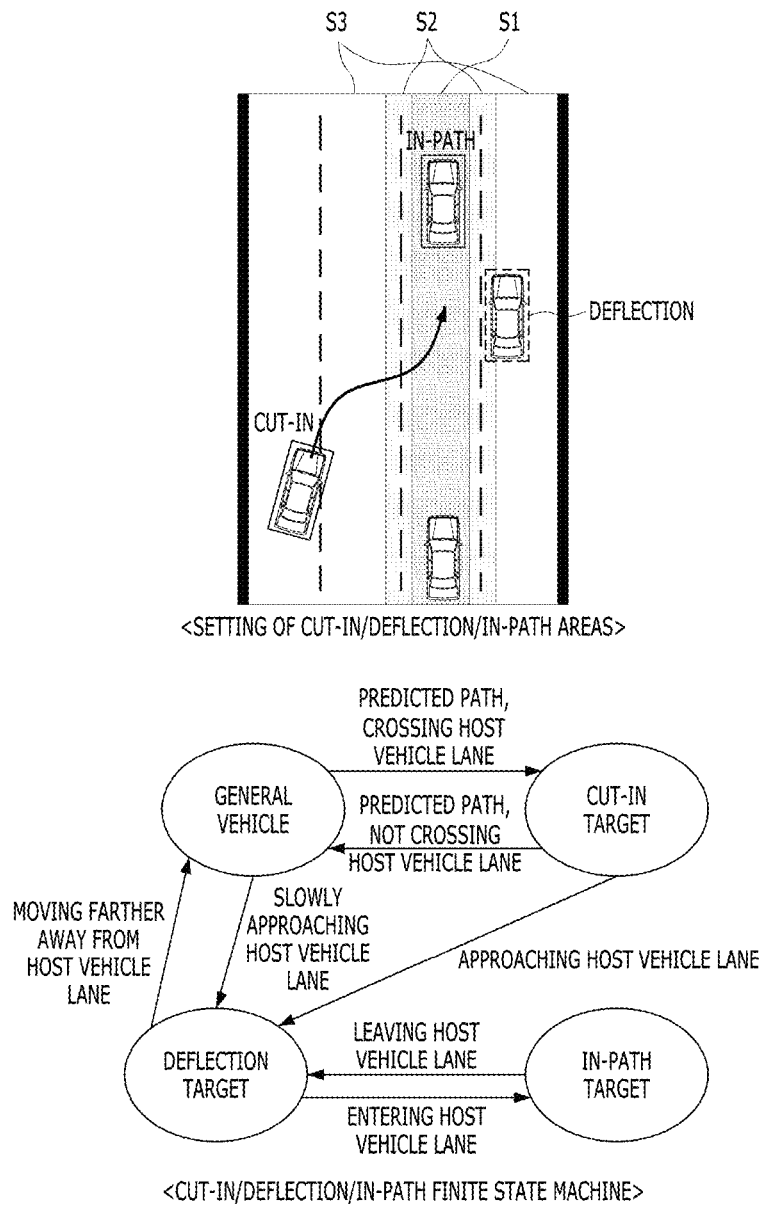

FIGS. 18 to 20 are views illustrating a method for determining a target object using contour points.

A method for determining integrated line-based positions of a target object using contour points are similar to a method for extracting an in-path target candidate group from line-based position information on objects based on box points thereof, but differs from the method for extracting the in-path target candidate group except that a margin is considered. That is, an object is not always determined as an in-path target when the contour points of the object come into a line or an integrated line, but the object is determined as an in-path target when the contour points thereof are located inside a virtual line drawn inside the line or the integrated line in consideration of a margin.

Here, the margin may be set differently depending on an object, and thus, an in-path area may also vary depending on an object. The margin may be set to a different value depending on attributes of an object, the current driving situation of a host vehicle, the predicted trajectory of the object, etc.

Referring to FIG. 18, the margin may be set differently depending on the longitudinal distance from the object to the host vehicle. For example, because, as the longitudinal distance increases, accuracy in the position information on the object measured by sensors and the rectangular coordinate system-based positioning information on the object is reduced, when the in-path area even at a position at a long distance from the host vehicle is set to be wide, objects in adjacent lanes may be frequently recognized as in-path objects.

Therefore, in order to maximally reduce influence on longitudinal control, the same margin may be applied up to a designated distance (for example, 60 m) from the host vehicle, but other margins may be set at distances exceeding the designated distance so that only objects located in a gradually narrow area may be determined as in-path targets.

Referring to FIG. 19A, when an object is once determined as an in-path target, the in-path area of the corresponding object may be further expanded.

Sensor and positioning errors may not always be constant, and an object may go into and out of the boundary of the in-path area. In this case, if the same object is determined as an in-path target and is then determined as not the in-path target, acceleration and deceleration must be repeated in longitudinal control. Therefore, ride comfort is reduced, and deceleration is not effectively performed and may thus cause collision. In order to prevent these problems, when an object is once determined as an in-path target, the in-path area of the corresponding object may be further expanded so as to continuously maintain the in-path target.

Referring to FIGS. 19B and 19C, an in-path area may be applied so that a cut-in or deflection vehicle may be more rapidly determined as an in-path target.

The in-path area, which is further expanded, may be applied to a cut-in candidate group object or a deflection object having a predicted trajectory crossing the path of the host vehicle so that the corresponding object may be more rapidly determined as an in-path target. When an object is previously determined as a cut-in object, as shown in FIG. 19B, the object is determined as an in-path target even though only a part of the contour thereof enters the host vehicle lane.

FIG. 20 is a view representing a method for determining cut-in, deflection and in-path target objects.

Referring to FIG. 20, in order to determine cut-in, deflection and in-path target objects, an in-path area S1, deflection areas S2, and cut-in areas S3 may be set.

The in-path area S1, which is a variable area, may be set to a trapezoidal area, and may be changed depending on the kind of the host vehicle, the speed of the host vehicle, and the driving type of the host vehicle. In the in-path area S1, targets are consistently observed for several frames so as to select reliable targets, and thus, when a target driving in the in-path area S1 exits the in-path area S1, the corresponding target may be treated as a deflection target. In general, the in-path area S1 may be set to an area in which other vehicles sufficiently enter into the integrated lines, so as to suppress frequent braking of the host vehicle.

The deflection areas S2 may be set to include some areas outside the integrated lines (for example, areas spaced outwardly apart from the integrated lines by 30 cm) so that a vehicle not coming into the integrated line but sufficiently approaching the integrated line may threaten driving of the host vehicle.

The cut-in areas S3 mean areas except for the in-path area S1. Therefore, when an object ranges from the deflection area S2 and the cut-in area S3, the corresponding object may be determined as being in a deflection state and a cut-in state, simultaneously. Therefore, the host vehicle may perform deceleration due to cut-in and deflection driving simultaneously.

As described above, by setting the in-path area S1, the deflection areas S2 and the cut-in areas S3, peripheral objects may be determined as cut-in target objects, deflection target objects, and in-path target objects.

Referring to FIG. 20, when the predicted path of a general vehicle crosses a host vehicle, the general vehicle may be determined as a cut-in target and, when a general vehicle is slowly approaching the host vehicle lane, the general vehicle may be determined as a deflection target.

When the predicted path of the cut-in target does not cross the host vehicle, the cut-in target may be determined as a general vehicle and, when the predicted path of the cut-in vehicle is approaching the host vehicle lane, the cut-in target may be determined as a deflection target.

When the deflection target is moving farther away from the host vehicle lane, the deflection target may be determined as a general vehicle and, when the deflection target enters the host vehicle lane, the deflection target may be determined as an in-path target.

When the in-path target exits the host vehicle lane, the in-path target may be determined as a deflection target and, when the in-path target is moving farther away from the host vehicle lane, the in-path target may be determined as a general vehicle.

Figure 22:
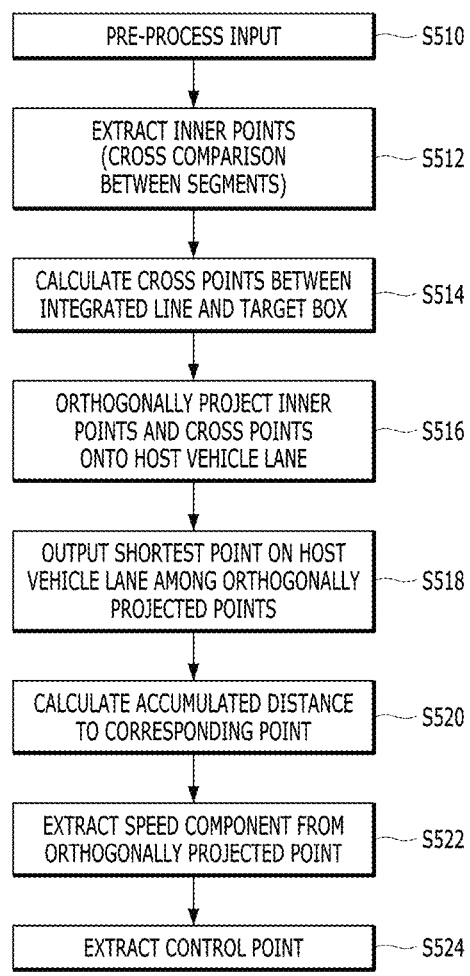

FIGS. 21 and 22 are views illustrating a method for extracting control points of in-path and deflection vehicles.

Referring to FIG. 21, control points of in-path and deflection vehicles must be selected so as to secure continuity in the control points during a process of entering the in-path area. Occurrence of a section in which the control points are discontinuous may cause sudden braking of the host vehicle and squealing of the brakes of the host vehicle.

In order to secure continuity in control points, the shortest point to the host vehicle lane among a predicted path, crossing points between a vehicle box and the integrated line, and box points in the integrated line may be selected as the control point.

The predicted entry point of a cut-in vehicle into the integrated line is converged on an initial violation point of the cut-in vehicle at a point in time when the cut-in vehicle actually comes into the integrated line as the cut-in vehicle approaches the host vehicle lane. Because the shortest point on the host vehicle lane among the crossing points between the integrated line and the vehicle box and the box points inside the integrated line coincides with the initial violation point of the cut-in vehicle according to the criterion of the control points of an in-path vehicle immediately after the cut-in vehicle violates the host vehicle lane, continuity in the control points of the cut-in target→the control points of the in-path target may be secured.

A deflection target which will not violate the host vehicle lane undergoes lateral control rather than longitudinal control, and thus does not cause sudden braking of the host vehicle and squealing of the brakes of the host vehicle. A deflection target which will violate the host vehicle lane is a cut-in target, and thus, continuity in control points thereof is secured, as described above.

A deflection target, which already violated the host vehicle lane but is not yet determined as an in-path target, follows the same control point calculation criterion as an in-path target, and thus, continuity in control points thereof may be secured.

FIG. 22 is a flowchart representing the method for extracting a control point.

Because main parameters in preceding vehicle tracking control are the distance between vehicles and the speed of the preceding vehicle, in order to execute host vehicle-dependent control, the curved distance to a control point of an object and a speed component at the control point of the corresponding object on the host vehicle path (a component acquired by orthogonally projecting a speed vector of the other vehicle onto the control point) are necessary. It is necessary to calculate the position of the control point on the host vehicle path based on the above-described control point criterion, and to calculate the speed component of the other vehicle at the control point.

Thereafter, in order to extract the control point, input pre-processing, such as setting of integrated lines, determination of a target object, etc., is performed (S510), cross comparison between segments from which inner points are extracted is performed (S512), and cross points between the integrated line and a target box are calculated (S514).

Thereafter, the inner points are acquired and are orthogonally projected onto the path of the host vehicle (S516).

The shortest point on the host vehicle lane among the orthogonally projected points is output (S518), and an accumulated distance to the shortest point along the host vehicle lane is calculated (S520). The accumulated distance is output as a distance from the object.

A speed component at the orthogonally projected point is extracted (S522), and thereby, a control point is extracted (S524). Because a scalar value acquired by orthogonally projecting a speed vector of the other vehicle on the local coordinate system of the host vehicle onto a tangent vector at the position of the control point in the host vehicle lane is the speed of the other vehicle in the host vehicle lane, the speed component at the orthogonally projected point may be extracted by calculating the above-described scalar value, and thereby, the control point may be extracted.

When in-path and deflection targets are selected, the in-path and deflection targets may be selected in the state of being interlocked with traffic signal information.

Figure 23:
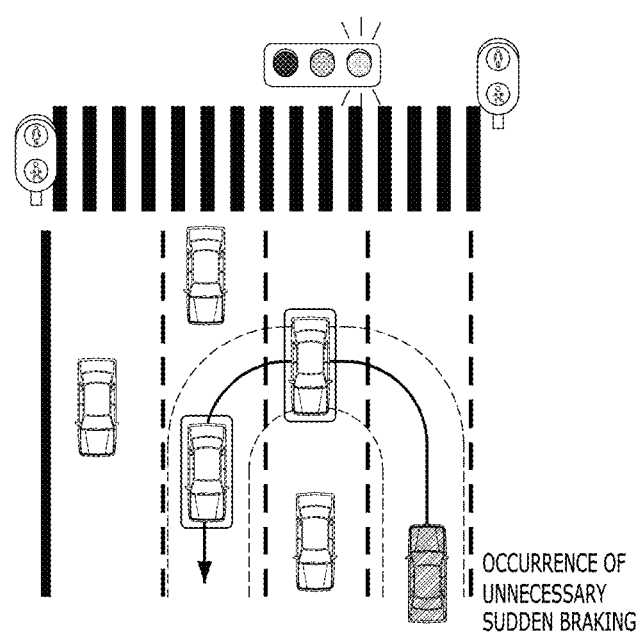
FIG. 23 is a view illustrating a method for selecting in-path and deflection targets in the state of being interlocked with traffic signal information.

FIG. 23 is a view illustrating a method for selecting in-path and deflection targets in the state of being interlocked with traffic signal information.

Referring to FIG. 23, when a host vehicle drives based on intersection signals, such as U-turn, left turn, and right turn signals, the host vehicle drives along a path only if a designated signal occurs.

If the host vehicle is braked by determining targets on the path of the host vehicle at all signals, the progress of the host vehicle up to an entry point may be blocked due to unnecessary braking. For example, as shown in FIG. 23, entry of the host vehicle into a U-turn area may be blocked by an object on a U-turn path at no U-turn signal.

Therefore, it is necessary to additionally provide effective information on targets determined as in-path targets depending on signals. However, when in-path targets on the opposite side are collectively filtered out depending on signal information, it is impossible to cope with a vehicle driving while violating signals. Therefore, instead of collectively filtering out the in-path targets, logic for determining the in-path targets as ineffective vehicles depending on signals may be added so as to cope with a vehicle driving while violating signals.

As described above, according to this embodiment of the present invention, when a host vehicle drives on a road including an unusual section, such as a section in which lines of a lane are discontinuous, a section in which a lane width is not constant, a turning section, such as a U-turn, etc., virtual lines may be derived selectively using information, such as a lane side, a lane link and a control path, and then, in-path and deflection values may be determined. Therefore, even when the host vehicle drives on a road including an unusual section, in-path and deflection values may be derived as in a normal road, and thus, the host vehicle may drive similarly to driving by a human so as to improve ride comfort.

Embodiments of the present invention may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid-state drive (SSD), a silicon disk drive (SDD), a ROM, a RAM, a CD-ROM, a magnetic tape, a floppy disk, an optical data storage device, etc.

As is apparent from the above description, an apparatus and method for controlling driving of a vehicle according to at least one embodiment of the present invention may determine in-path and deflection values when the vehicle drives on a road including an unusual section, such as a section in which lines of a lane are discontinuous, a section in which a lane width is not constant, a turning section, such as a U-turn, etc. Therefore, even when the vehicle drives on a road including an unusual section, the vehicle may autonomously drive along natural in-path and deflection paths as if a person actually drives the vehicle, so as to improve ride comfort.

Particularly, generalized virtual lines may be derived using information, such as a lane side, a lane link and a control path depending on a road shape and a driving situation, vehicles driving on a road are classified into vehicles in a host vehicle lane and causing the host vehicle to drive in the deflection state so as to avoid these vehicles, and control points for in-path and deflection driving may be derived, thereby being capable of determining the in-path and deflection values identically with a normal road even when the host vehicle drives on the road including an unusual section.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for controlling driving of a vehicle, the method comprising:
    collecting driving environment information including drive lanes and positions of a host vehicle and an object on a periphery of the host vehicle;
    generating virtual integrated lines based on a lane link, a lane side or a control path included in the driving environment information;
    extracting a target candidate group by determining a position of the object based on the virtual integrated lines;
    selecting a control target based on position relations between the virtual integrated lines and contour points of the target candidate group;
    calculating a control point to be tracked; and
    controlling driving of the host vehicle based on the control point,
    wherein, when the lane side has an irregular shape, and the lane link and the control path do not coincide with each other, generating the virtual integrated lines comprises:
        generating the virtual integrated lines based on the control path, wherein the control path is corrected in a current frame (frame N) so as to conform to a current change in a position of the host vehicle.

2. The method according to claim 1, wherein generating the virtual integrated lines comprises:
    detecting the lane side as having the irregular shape; and
    comparing the lane link and the control path with each other in response to detecting the lane side as having the irregular shape.

3. The method according to claim 2, wherein generating the virtual integrated lines further comprises:
    generating the virtual integrated lines based on the lane link when the lane link and the control path coincide with each other.

4. The method according to claim 1, wherein generating the virtual integrated lines comprises generating the virtual integrated lines based on the lane side when the lane side is continuously formed to have a regular shape and the object is not deflected into the lane side.

5. The method according to claim 1, wherein extracting the target candidate group comprises:
    setting four box points of the object; and
    extracting the target candidate group comprising an in-path target candidate and a deflection target candidate based on positions of the four box points with respect to the virtual integrated lines.

6. The method according to claim 5, wherein extracting the target candidate group further comprises:
    extracting the object as the in-path target candidate when at least one of the four box points of the object is located inside the virtual integrated lines; or
    extracting the object as the in-path target candidate when at least one of the four box points of the object is located outside one of the virtual integrated lines and at least one other of the four box points is located outside a remaining one of the virtual integrated lines.

7. A computer readable recording medium having recorded thereon a program to execute the method according to claim 1.

8. A method for controlling driving of a vehicle, the method comprising:
    collecting driving environment information including drive lanes and positions of a host vehicle and objects on a periphery of the host vehicle;
    generating virtual integrated lines based on a lane link, a lane side or a control path included in the driving environment information;
    extracting a target candidate group by determining positions of the objects based on the virtual integrated lines;
    selecting a control target based on position relations between the virtual integrated lines and contour points of the target candidate group, wherein selecting the control target based on the position relations between the integrated lines and the contour points of the target candidate group comprises:
        setting an area inside the virtual integrated lines to an in-path area, setting areas other than the in-path area to cut-in areas, and setting some areas outside the virtual integrated lines to deflection areas; and
        selecting an in-path target, a cut-in target and a deflection target based on position relations between the contour points of the objects extracted as the target candidate group, and the in-path area, the cut-in areas and the deflection areas;
    calculating a control point to be tracked; and
    controlling driving of the host vehicle based on the control point.

9. The method according to claim 8, wherein the in-path area has a trapezoidal shape having a width gradually decreased in a forward direction, and is changed depending on a width of the host vehicle, a speed of the host vehicle, and a driving type of the host vehicle.

10. The method according to claim 8, further comprising:
    setting different in-path margins with respect to the objects extracted as the target candidate group,
    wherein selecting the in-path target, the cut-in target and the deflection target comprises, when any one of the objects enters the in-path area by the in-path margin set with respect to the corresponding object or more, setting the corresponding object to the in-path target.

11. The method according to claim 10, wherein, as distances of the objects from the host vehicle are increased, the in-path margins with respect to the objects are set to be increased so that, when any one of the objects enters a corresponding narrow range of the in-path area, the corresponding object is determined as the in-path target.

12. The method according to claim 10, wherein selecting the in-path target, the cut-in target and the deflection target further comprises expanding the in-path area with respect to the object set to the in-path target so as to maintain a qualification of the corresponding object as the in-path target.

13. The method according to claim 10, wherein selecting the in-path target, the cut-in target and the deflection target further comprises:
predicting trajectories of the objects extracted as the target candidate group; and
expanding the in-path area with respect to a cut-in target candidate object and a deflection target candidate object having the predicted trajectories crossing a path of the host vehicle.

14. An apparatus for controlling driving of a vehicle, the apparatus comprising:
a first determiner configured to collect driving environment information including drive lanes and positions of a host vehicle and an object on a periphery of the host vehicle;
a second determiner configured to generate virtual integrated lines based on a lane link, a lane side, or a control path included in the driving environment information, to extract a target candidate group by determining a position of the object based on the integrated lines, and to select a control target based on position relations between the integrated lines and contour points of the target candidate group,
wherein, when the lane side has an irregular shape, and the lane link and the control path do not coincide with each other, generating the virtual integrated lines comprises:
generating the virtual integrated lines based on the control path, wherein the control path is corrected in a current frame (frame N) so as to conform to a current change in a position of the host vehicle; and
a driving controller configured to control driving of the host vehicle based on the control target.

15. The apparatus according to claim 14, wherein the control target comprises an in-path target, a cut-in target, or a deflection target.

16. The apparatus according to claim 15, wherein the first determiner comprises:
a host vehicle position recognition module configured to output position information on the host vehicle using precise map information;
a road information fusion module configured to output the position information of the host vehicle and precise map information on the periphery of the host vehicle; and
an object fusion module configured to fuse object information comprising information about the host vehicle and information about the object onto the precise map information and to output fused information.

17. The apparatus according to claim 15, wherein the second determiner comprises:
an integrated line calculation module configured to derive the virtual integrated lines based on the lane link, the lane side, or the control path included in the driving environment information, depending on a result of determination of the first determiner;
a line-based box point position calculation module configured to calculate a position of the object on the periphery of the host vehicle based on the virtual integrated lines;
a target object candidate calculation module configured to extract the target candidate group by comparing position information on four box points of the object on the periphery of the host vehicle with the virtual integrated lines;
a line-based contour point position calculation module configured to calculate positions of contour points of the target candidate group based on the virtual integrated lines; and
a control target calculation module configured to select the control target based on position relations between the virtual integrated lines and the contour points of the target candidate group.

18. The apparatus according to claim 17, wherein the integrated line calculation module is configured to:
generate the virtual integrated lines based on the lane link when the lane side is detected as having an irregular shape and the lane link and the control path coincide with each other;
generate the virtual integrated lines based on the control path when the lane side is detected as having an irregular shape and the lane link and the control path do not coincide with each other; and
generate the virtual integrated lines based on the lane side when the lane side is continuously formed to have a regular shape and the object is not deflected into the lane side.

19. The apparatus according to claim 17, wherein:
the target object candidate calculation module is configured to extract a corresponding object as an in-path target candidate when the four box points of the object are set and at least one of the four box points of the object is located inside the virtual integrated lines; or
the target object candidate calculation module is configured to extract the corresponding object as the in-path target candidate when at least one of the four box points of the object is located outside one of the virtual integrated lines and at least one other of the four box points is located outside a remaining one of the virtual integrated lines.

20. The apparatus according to claim 17, wherein the control target calculation module is configured to:
set an area inside the virtual integrated lines to an in-path area;
set areas other than the in-path area to cut-in areas;
sets some areas outside the virtual integrated lines to deflection areas; and
select the in-path target, the cut-in target and the deflection target based on position relations between the contour points of the object extracted as the target candidate group, and the in-path area, the cut-in areas and the deflection areas.

* * * * *